United States Patent [19]

Ludwick

[11] Patent Number: 4,606,046
[45] Date of Patent: Aug. 12, 1986

[54] CONVERTER/LINE DRIVER CIRCUIT FOR A LINE REPEATER

[75] Inventor: John J. Ludwick, Hampton, N.H.

[73] Assignee: AT&T Bell Laboratories, Murray Hill, N.J.

[21] Appl. No.: 565,723

[22] Filed: Dec. 27, 1983

[51] Int. Cl.[4] .................. H03H 7/30; H03H 7/40
[52] U.S. Cl. ........................... 375/17; 375/36; 330/195; 330/276; 307/264
[58] Field of Search ............ 375/17, 36; 307/264; 330/195, 276; 370/112

[56] References Cited

U.S. PATENT DOCUMENTS

| | | | |
|---|---|---|---|
| 3,149,323 | 9/1964 | Aaron et al. | 340/347 |
| 3,502,810 | 3/1970 | Aaron et al. | 375/17 |
| 3,731,199 | 5/1973 | Tazaki et al. | 375/17 |
| 3,744,051 | 7/1973 | Sanders et al. | 375/36 |
| 3,800,245 | 3/1974 | Basu | 332/9 |
| 3,876,944 | 4/1975 | Mack et al. | 375/17 |
| 3,943,284 | 3/1976 | Nelson | 370/112 |
| 3,980,826 | 9/1976 | Widmer | 178/68 |
| 4,070,650 | 1/1978 | Ohashi et al. | 340/172 |
| 4,083,005 | 4/1978 | Looschen | 375/17 |
| 4,101,734 | 7/1978 | Dao | 375/36 |
| 4,244,051 | 1/1981 | Fujikura et al. | 375/17 |
| 4,309,693 | 1/1982 | Craven | 307/264 |
| 4,403,330 | 9/1983 | Meyer | 375/4 |

FOREIGN PATENT DOCUMENTS

| | | | |
|---|---|---|---|
| 0094624 | 11/1983 | European Pat. Off. | |
| 54-44461 | 4/1979 | Japan | |
| 0097763 | 7/1980 | Japan | 375/17 |

Primary Examiner—Douglas W. Olms
Assistant Examiner—Wellington Chin
Attorney, Agent, or Firm—Richard B. Havill

[57] ABSTRACT

A converter circuit receives N-rail logic signals and converts them into a precision N-level signal. A pair of line drivers is connected in a balanced output arrangement with the primary winding of an output transformer. In response to the N-rail logic signals, weighted currents are conducted through an input impedance, connected with the line drivers, to a ground reference. As a result the line drivers conduct various levels and polarities of current through the entire primary winding of the output transformer. Thereby a precision N-level signal is produced in a secondary winding of the output transformer and at the converter output terminals.

8 Claims, 7 Drawing Figures

| LOGIC TABLE | | | | | | |
|---|---|---|---|---|---|---|
| INPUT LOGIC SIGNALS | | | | BUS 42 | BUS 41 | OUTPUT LEVEL |
| $IN_1$ | $IN_2$ | $IN_3$ | $IN_4$ | | | |
| 0 | 1 | 1 | 1 | $3I + I + 3I$ | $I$ | +3 |
| 1 | 0 | 1 | 1 | $I + I + 3I$ | $3I$ | +1 |
| 1 | 1 | 1 | 1 | $I + 3I$ | $I + 3I$ | 0 |
| 1 | 1 | 1 | 0 | $3I$ | $I + I + 3I$ | -1 |
| 1 | 1 | 0 | 1 | $I$ | $3I + I + 3I$ | 3 |

| LOGIC TABLE ||||| 
|---|---|---|---|---|
| INPUT LOGIC SIGNALS || BUS 108 | BUS 107 | OUT PUT LEVEL |
| $IN_1$ | $IN_2$ | | | |
| 0 | 1 | $I + I$ | 0 | $+1$ |
| 1 | 1 | $I$ | $I$ | 0 |
| 1 | 0 | 0 | $I + I$ | $-1$ |

CONVERTER/LINE DRIVER CIRCUIT FOR A LINE REPEATER

BACKGROUND OF THE INVENTION

This invention relates to a converter circuit for a digital line repeater, which may be described more particularly as a converter for producing a precision N-level signal.

Digital transmission lines have been developed for a variety of transmission media. In particular, three systems, T1, T1C and T2 have been designed to operate on wire pairs.

T1 is a twenty-four channel system that operates at 1.544 Mb/s on exchange grade cable. Maximum repeater spacing is in excess of 6000 feet on 22-gauge copper pairs. The T1 system is limited to 50 miles in length.

T1C is a forty-eight channel system that operates at 3.152 Mb/s on pulp, PIC and MAT exchange grade cable. Maximum repeater spacing is greater than 6000 feet on 22-gauge copper pairs, and the sytem is limited to 50 miles.

T2 is a ninety-six channel system which operates at 6.312 Mb/s on a low-capacitance PIC cable. Maximum repeater spacing is 14,800 feet. The T2 system is used on intercity routes as long as 500 miles.

Growth in the use of digital transmission facilities has stimulated needs for new plans and new system designs. For instance many short system routes, which have exchange grade cable arranged for T1C systems, are reaching the capacity of their cables.

Additional digital transmission facilities can be furnished by laying another cable or by increasing the capacity of the existing cable. The installation of such a new cable often is extremely expensive. An attractive alternative is to increase the capacity of the electronics operating in the existing cable without adding any new cable. The capacity of the electronics can be increased from forty-eight channels to ninety-six channels by transmitting an unrestricted 4-level pulse-amplitude modulated signal rather than the standard bipolar signal used in the T1C system.

A new converter is required to produce the 4-level signal to be transmitted along the wire pairs in the cable. Heretofore a converter, for producing the 4-level signal includes transistors of opposite conductivity types and bias sources of both positive and negative polarities. Mismatches between the devices and between the bias sources cause operational problems which are either difficult or costly to control in systems having the converters deployed in repeater circuits in the uncontrolled environment along the cable route.

SUMMARY OF THE INVENTION

These and other problems are solved by a converter circuit arranged for receiving N-rail logic signals and converting them into a precision N-level signal. A pair of line drivers is connected in a balanced output arrangement with the primary winding of an output transformer. In response to the N-rail logic signals, weighted currents are conducted through an input impedance, connected with the line drivers, to a ground reference. As a result the line drivers conduct different levels and polarities of current through the entire primary winding of the output transformer. Thereby the precision N-level signal is produced in a secondary winding of the output transformer and at the converter output terminals.

BRIEF DESCRIPTION OF THE DRAWINGS

A better understanding of the invention may be derived from the subsequent detailed description when that description is read with reference to the appended drawings wherein.

DETAILED DESCRIPTION

Figure 1:
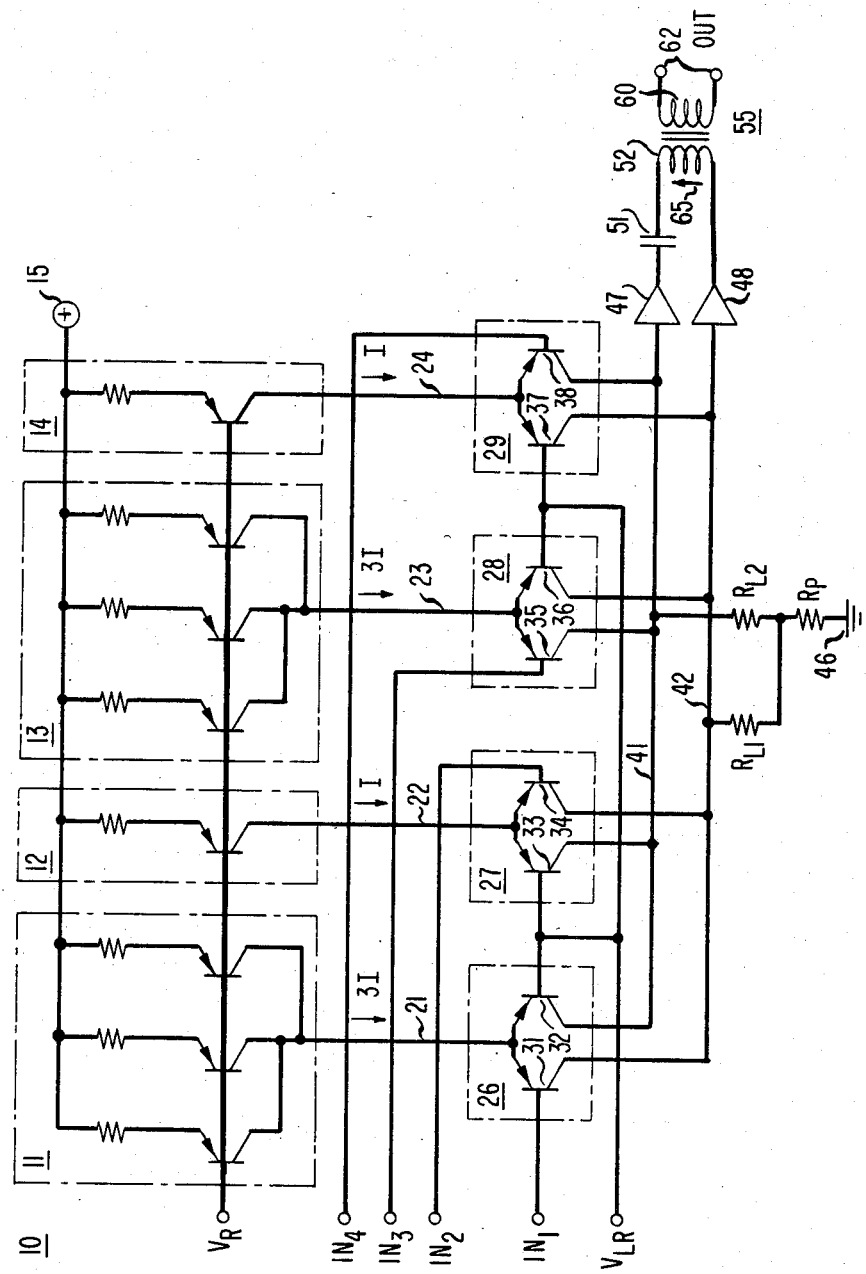
FIG. 1 is a schematic diagram of a converter circuit for producing the precision N-level signal.

Referring now to FIG. 1, there is shown a converter circuit 10 which is arranged for receiving 4-rail logic information on input leads $IN_1$, $IN_2$, $IN_3$, and $IN_4$ and for converting it into a precision 4-level output signal on a pair of output leads OUT. Advantageously the circuit 10 can be fabricated readily as a monolithic integrated circuit. All of the active devices are of the same conductivity type. Only a single polarity bias supply is used. Although PNP devices are shown in FIG. 1, NPN devices could be substituted as long as polarities are changed appropriately.

Figure 2:
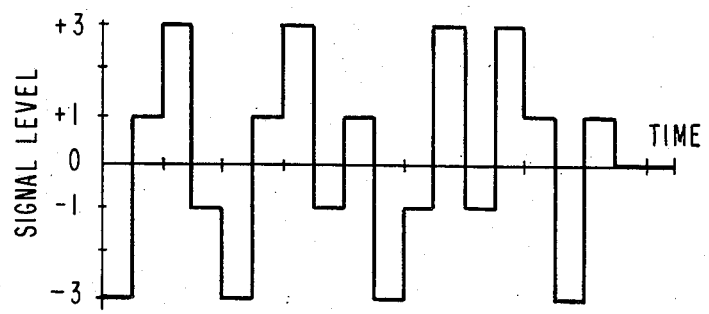
FIG. 2 is a diagram representing a 4-level signal produced by the circuit of FIG. 1.

FIG. 2 shows a waveform representing a 4-level signal. There are positive polarity pulses having either of two different potential levels. Negative polarity pulses also have either of two different potential levels. The four potential levels are selected to be $+3$, $+1$, $-1$, and $-3$ so that there are equal separations between adjacent levels.

Figure 3:
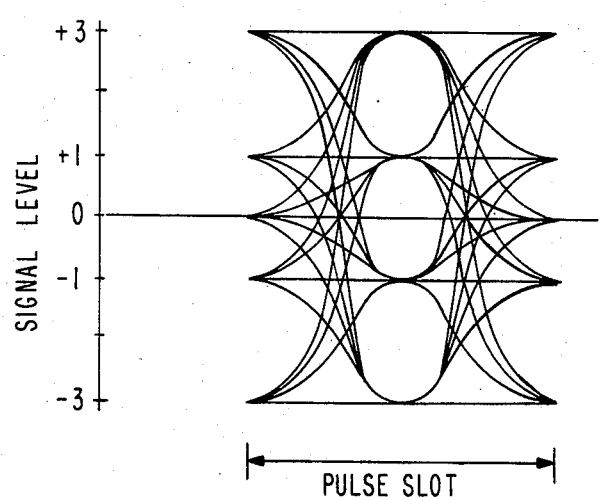
FIG. 3 is an eye diagram for the 4-level signal.

In FIG. 3, there is shown an eye diagram for a 4-level signal as it appears at the decision point in the repeaters along a transmission line. This eye diagram is a repetitive trace over a single pulse time slot of the 4-level signal as the various levels actually occur sequentially in time. The signal shown in the eye diagram traverses all of the various level transitions which can occur between any pulse and the next subsequent pulse. When no signal is transmitted, a zero potential level occurs on the output line. A zero level signal is shown on the horizontal axis at the right end of the pulse sequence in FIG. 2 and is shown across the center of the eye diagram of FIG. 3.

In the converter circuit 10 of FIG. 1, four current sources 11, 12, 13 and 14 are arranged for supplying weighted currents continuously during operation. The current sources 11, 12, 13 and 14 each contains one or more than one PNP conductivity type transistor connected in a common-emitter configuration. An emitter resistor is connected between a positive polarity source of bias potential 15 and the emitter electrode. The emitter resistors have equal resistances.

Current sources 12 and 14 each includes a single PNP transistor for supplying a single unit of current I through leads 22 and 24 during operation.

Current sources 11 and 13 each includes three PNP transistors for supplying three units of current 3I through leads 21 and 23 during operation.

All of the transistors in the current sources 11, 12, 13 and 14 are designed to match one another. Because the transistors and the emitter resistors are fabricated in a monolithic integrated circuit, the devices are matched closely. A reference voltage $V_R$ is applied in common to the base electrodes of all of the transistors in the current sources 11, 12, 13 and 14. The current generated by each source is determined by the voltage across each emitter resistor and is controlled by the reference voltage $V_R$. The magnitude of the reference voltage $V_R$ tracks any changes in the magnitude of the voltage of the bias supply 15 and any changes of the base-emitter voltages $V_{BE}$ over time and temperature. The net effect is a constant voltage across the emitter resistors. As a result the currents produced by the current sources are equal and are independent of temperature.

The continuous currents supplied through the leads 21, 22, 23 and 24 are current sources for four current switches 26, 27, 28 and 29. Each of the current switches 26, 27, 28 and 29 includes a pair of PNP conductivity type transistors interconnected as an emitter-coupled pair. A reference potential $V_{LR}$ is applied to the input base electrode of one of the transistors of each current switch. In this regard, the lead for applying the reference potential $V_{LR}$ is connected to the base electrodes of the transistors 32, 33, 36 and 37.

Each one of the input leads $IN_1$, $IN_2$, $IN_3$, and $IN_4$ is connected to the input base electrode of the other transistor of a separate one of the current switches. Thus the input lead $IN_1$ is connected to the input base electrode of the transistor 31 in the current switch 26. Input leads $IN_2$, $IN_3$ and $IN_4$ are connected, respectively, to the input base electrodes of the transistors 34, 35 and 38.

Figures 4, 5:
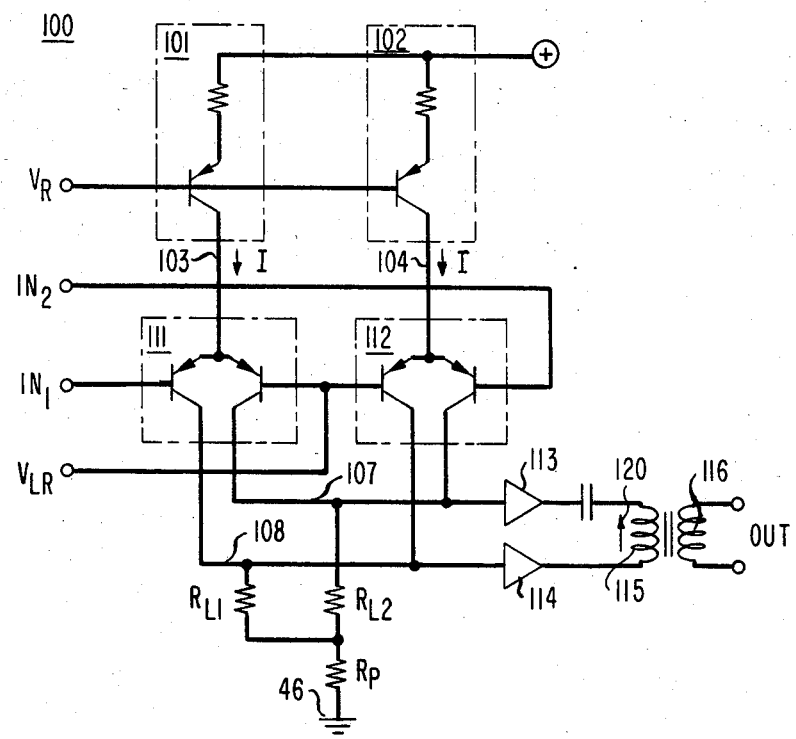
FIG. 4 is a table showing the logic states which occur in the circuit of FIG. 1 for selecting various operating conditions that produce each distinct level.
FIG. 5 is a schematic diagram of a converter circuit for producing a precision 2-level signal.

Referring now to FIG. 4, there is shown a table of input logic information which is applied selectively to the input leads $IN_1$, $IN_2$, $IN_3$ and $IN_4$. Each signal level requires the input logic signals shown on a separate line in FIG. 4. It requires one logic zero and three logic ones. The four input logic signals are applied in parallel to the input leads. A logic one is more positive than the potential of the reference potential $V_{LR}$ which is applied to the current switches of FIG. 1. Each logic zero has a potential that is sufficiently less positive than the reference potential $V_{LR}$ to cause any current switch to switch its current from one output collector circuit to the other.

In conjunction with the current switches 26, 27, 28 and 29, there are two output busses 41 and 42. The two collector output leads from each current switch are connected to opposite ones of the busses 41 and 42. Thus the collectors of the transistors 32, 33, 35 and 38 are connected to the bus 41. The collectors of the transistors 31, 34, 36 and 37 are connected to the bus 42.

As previously mentioned, the four input logic signals are applied simultaneously, i.e. in parallel, to all four of the input leads. Thus for each signal level, three of the current switches will have logic ones applied by way of their input leads and one current switch will have a logic zero applied to its input lead. When logic ones are applied to their inputs, the current switches 26 and 27 conduct all of their emitter currents to their regular output bus 41. Likewise the current switches 28 and 29 conduct all of their emitter currents to their regular bus 42 when a logic one is applied to each of their input leads. Each time a logic zero is applied to one of the input leads, the emitter current in the activated current switch changes from its regular output bus to the other output bus. Thus in the top row of the logic table, the logic zero on the input lead $IN_1$ causes the transistor 31 to conduct the three units of current 3I from the emitter lead 21 to the output bus 42. The logic one, applied by way of the input lead $IN_2$ to the current switch 27, allows its emitter current in lead 22 to continue to be conducted through its regular output bus 41. Also the logic ones, applied by way of the input leads $IN_3$ and $IN_4$ to the current switches 28 and 29, allow them to continue to conduct their emitter currents from the leads 23 and 24 to the output bus 42.

As a result of the logic zero on the input lead $IN_1$ and the logic ones on the input leads $IN_2$, $IN_3$ and $IN_4$, there are seven units of current $3I+I+3I$ conducted to the bus 42 and one unit of current I conducted to the bus 41, as shown in the top row of FIG. 4.

Other combinations of input logic signals cause output bus currents, as shown in the other rows of the logic table of FIG. 4.

The all logic ones combination, shown in the middle row of FIG. 4, represents the operation of the converter 10 of FIG. 1 when no signal is occurring on the transmission line in which the converter 10 is working. During such no signal operation, there are four units of current $I+3I$ conducted to each of the output busses 41 and 42.

A balanced load impedance conducts the various combinations of currents from the output busses 41 and 42 to a reference potential 46 which is shown illustratively as ground. In the load impedance, there is a pair of matched resistors $R_{L1}$ and $R_{L2}$ which are connected in branches, respectively, between the output busses 41 and 42. Another resistor $R_p$ is connected from the node between the resistors $R_{L1}$ and $R_{L2}$ to the reference potential 46. At all times, the current in the resistor $R_p$ is the sum of all currents from the four current sources. It is a constant current. There is no need for the branch resistors $R_{L1}$ and $R_{L2}$ to be precisely matched to each other. This load impedance functions as a balanced input impedance for a pair of line drivers 47 and 48 which have their inputs connected, respectively, to the busses 41 and 42. The line drivers 47 and 48 are voltage follower amplifiers operating in a balanced differential mode and are capable of driving sufficient current into the balanced transmission line. The value of the resistor $R_p$ is selected so that with no logic signal applied to the inputs, the resulting voltage applied to the line drivers is at their mid-range operating point.

The five combinations of input logic signals presented in the logic table of FIG. 4, represent different operating conditions for the output arrangement of the converter circuit 10 of FIG. 1. For instance when all logic ones are applied for the no signal condition, there are four units of current $I+3I$ which are conducted through the bus 42 and the load resistors $R_{L1}$ and $R_p$ to the ground reference potential 46. Simultaneously there are four units of current also conducted through the bus 41 and the load resistors $R_{L2}$ and $R_p$ to the ground reference potential 46. These equal currents being conducted through the balanced branches of the input impedance of the line drivers 47 and 48 cause them to produce equal output signal currents.

For purposes of developing multilevel output signals, the line drivers 47 and 48 are connected in a differential balanced output arrangement. The output of the line driver 47 is coupled through a capacitor 51 to one terminal of a primary winding 52 of an output transformer 55. Line driver 48 has its output terminal coupled to the other terminal of the primary winding 52.

When there is no input signal, the equal signal currents from the line drivers 47 and 48 are of opposite polarities in the primary winding 52 of the output transformer 55. As a result the two signals offset one another in the primary winding 52 producing a zero level reference signal in the secondary winding 60 and across the output terminals 62 of the converter 10.

When an input signal is applied, it changes one of the logic input signals to a logic zero while the other inputs remain logic ones. The current from one of the current sources is switched to the opposite output bus and to the opposite side of the impedance $R_{L1}$, $R_2$ and $R_p$. For instance when the input lead $IN_2$ goes to zero, the single unit of current I in the lead 22 is switched from the transistor 33 and bus 41 to the transistor 34 and the bus 42. As a result, three units of current 3I are left in the bus 41 and the branch including the resistor $R_{L2}$ while five units of current $I+I+3I$ are conducted through the bus 42 and the branch including the resistor $R_{L1}$. It follows that the output signal currents from the line drivers 47 and 48 are three units and five units, respectively. Since these currents are superimposed upon one another and are of opposite polarity in the primary winding 52, there is a net current of two units in that winding. This net current has a polarity in the direction of the arrow 65. Polarity of this net current is considered to be positive. These two units of current in the primary winding 52 are transformed into the secondary winding 60 as a positive polarity output signal having a level of one, as shown in the righthand column of the second row from the top of FIG. 4.

Likewise in FIG. 1 when a logic zero is applied to the input $IN_2$, it causes three units of current 3I to switch from the bus 41 to the bus 42 while logic ones on the other inputs maintain conduction to their regular output busses, as shown in the top row of FIG. 4. Resulting currents through the busses 41 and 42, respectively, are one unit of current I and seven units of current $3I+I+3I$. Correlated currents in the primary winding 52 produce a net signal of six units of current. Polarity of the net current is in the direction of the arrow 65 and is considered to be positive. At the secondary winding, there is an output signal having positive polarity and a level of three, as shown in the righthand column of the top row of FIG. 4.

Operation with logic zeroes applied sequentially on the leads $IN_3$ and $IN_4$ can be analyzed in accordance with the bottom two rows of the logic table of FIG. 4. Those logic levels will produce an output signal having a negative polarity and levels of one and three, respectively, as shown in the righthand column in the logic table of FIG. 4.

Referring now to FIG. 5, there is shown another converter circuit 100 which is like the converter circuit 10 of FIG. 1, but has been modified for receiving 2-rail logic signals on inputs $IN_1$ and $IN_2$. Those signals are converted into a precision 2-level output signal on the pair of output leads OUT of the converter 100. Like the circuit of FIG. 1, the converter circuit 100 of FIG. 5 can be fabricated readily as a monolithic integrated circuit. All transistors are of like conductivity type. Only a single polarity bias supply is used.

Figures 6, 7:
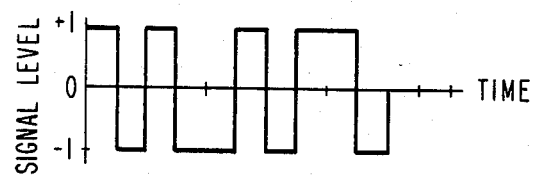
FIG. 6 is a diagram representing the 2-level signal produced by the circuit of FIG. 5.
FIG. 7 is a table showing the logic states which occur in the circuit of FIG. 5 to produce the 2-level signal, shown in FIG. 6.

FIG. 6 is a waveform representing a 2-level signal. One level of positive polarity pulses and one level of negative polarity pulses occur in the pulse stream.

In the circuit of FIG. 5, there are only two current sources 101 and 102, each of which produces one unit of current I, respectively, in leads 103 and 104. These currents are switched to one or the other of two output busses 107 and 108 by current switches 111 and 112. Currents which occur in the busses 107 and 108 are conducted through the balanced branches of the impedance including the resistors $R_{L2}$, $R_{L1}$, and the resistance $R_p$ to the ground reference potential 46.

FIG. 7 presents a logic table for the operating conditions which describe the operation of the converter circuit 100 of FIG. 5. When no input signal is present, logic ones are applied to the input terminals $IN_1$ and $IN_2$. This operating condition is shown in the center row of the table in FIG. 7. A unit of current I is conducted through each of the busses 107 and 108 and each of the balanced branches of the input impedance to ground. Resulting signals on the busses produce equal currents from the output line drivers 113 and 114. The balanced output arrangement through the primary winding 115 of the output transformer causes the resulting equal output currents to offset one another. As a result a reference zero level output signal is produced in the secondary winding 116 of the output the transformer and across the converter circuit output terminals OUT.

When an input signal is present, a positive or a negative output signal occurs at the output terminals OUT of the converter circuit 100 in FIG. 5. For instance, as shown in the top row of the table of FIG. 7, a logic zero applied to the input $IN_1$ while a logic one is applied to the input $IN_2$ produces two units $I+I$ of current in the output bus 108 and zero units of current in the bus 107. In the primary winding there is a net of two units of current having a polarity in the direction of the arrow 120. This produces in the secondary winding 116 a positive polarity output signal having a level of one. Likewise when a logic zero is applied to the input $IN_2$ while a logic one is applied to the input $IN_1$, the converter circuit 100 produces a negative polarity output signal havinga level of one, as shown in the bottom line of the table of FIG. 7. Thus the converter circuit 100 produces a precision 2-level signal in response to the 2-rail logic information applied to the input leads $IN_1$ and $IN_2$.

Thus it has been shown that the converter circuits 10 and 100 are responsive to N-rail logic signals for producing a precision N-level output signal. That is the converter 10 responds to 4-rail (N=4) logic information for producing a precision 4-level (N=4) output signal. Converter 100 responds to 2-rail (N=2) logic information for producing a precision 2-level (N=2) output signal. Other converters using the principle of the invention can be shown for N=6, etc. For a converter wherein N=6, the additional current sources would supply five units of current 5I.

It is noted that the code conversions are accomplished by converter circuits which include only transistors of like conductivity type. The bias supply is of only one polarity. The balanced output arrangement from the current switches through the busses, the impedance, the line drivers and the output transformer enables the advantageous utilization of the logical combinations of the weighted current sources.

The foregoing describes some embodiments of the subject invention. The described embodiments together with other embodiments made obvious in view thereof are considered to be within the scope of the claims.

What is claimed is:

1. A converter circuit arranged for receiving N-rail logic signals and converting them into a precision N-level signal, the converter being characterized by an output transformer having a primary winding and a secondary winding;

first and second line drivers, each having an input terminal and an output terminal, the output terminals of the first and second line drivers being coupled to the primary winding of the output transformer in a balanced output arrangement;

an impedance including branches coupling the input terminals of the first and second line drivers to a reference potential; and means, responsive to the N-rail logic signals, for selectively conducting, through at least two of the branches of the impedance, currents having magnitudes selected to cause the first and second line drivers to conduct various levels and polarities of current through the entire primary winding of the output transformer for producing a precision N-level signal in the secondary winding of the output transformer.

2. A converter circuit in accordance with claim 1 wherein the selectively conducting means include N weighted current sources; and means, responsive to the N-rail logic signals, for selectively switching the weighted currents from the current sources through the branches of the impedance.

3. A converter circuit in accordance with claim 2 wherein the weighted current sources and the selectively switching means comprise like conductivity type transistors.

4. A converter circuit in accordance with claim 3 wherein the weighted current sources, the selectively switching means, and the first and second line drivers are biased from a source of potential having one polarity with respect to the reference potential.

5. A converter circuit arranged for receiving 4-rail logic signals and converting them into a precision 4-level signal, the converter circuit comprising an output transformer including a primary winding and a secondary winding;

first and second line drivers, each having an input terminal and an output terminal, the output terminals of the first and second line drivers being coupled to the primary winding of the output transformer in a balanced output arrangement;

an impedance including branches coupling the input terminals of the first and second line drivers to a reference potential; and means, responsive to the 4-rail logic signals, for selectively conducting through the branches of the impedance, currents having magnitudes selected to cause the first and second line drivers to conduct through the entire primary winding one of two different levels of current of either polarity thereby producing the precision 4-level signal in the secondary winding of the output transformer.

6. A converter circuit in accordance with claim 5 wherein the selectively conducting means include first, second, third and fourth current sources, the first and third current sources each supply three units of current and the second and fourth current sources each supply one unit of current; and current switching means, responsive to the 4-rail logic signals, for selectively switching the three units of current from each of the first and third current sources through the branches of the impedance and for selectively switching the one unit of current from each of the second fourth current sources through the branches of the impedance.

7. A converter circuit in accordance with claim 6 wherein the first, second, third and fourth current sources and the current switching means comprise like conductivity type transistors.

8. A converter circuit in accordance with claim 7 wherein the first, second, third and fourth current sources, the current switching means, and the first and second line drivers are biased from a source of potential having one polarity with respect to the reference potential.

* * * * *